United States Patent [19]

Lebduska

[11] 3,884,585

[45] May 20, 1975

[54] FIBER BREAK DETECTION METHODS FOR CABLES USING MULTI-FIBER OPTICAL BUNDLES

[75] Inventor: Robert L. Lebduska, La Mesa, Calif.

[73] Assignee: The United States of America as represented by the Secretary of the Navy, Washington, D.C.

[22] Filed: Feb. 25, 1974

[21] Appl. No.: 445,406

[52] U.S. Cl. .............................. 356/239; 356/201
[51] Int. Cl. .......................................... G01n 21/16
[58] Field of Search ................. 356/201, 237, 239; 350/96 B

[56] References Cited
UNITED STATES PATENTS
3,565,536   2/1971   Wuellner et al. .................... 356/239

Primary Examiner—Vincent P. McGraw
Attorney, Agent, or Firm—R. S. Sciascia; G. J. Rubens

[57] ABSTRACT

A method and apparatus for detecting and assessing the light transmitting integrity of the individual fibers in a multi-fiber optic cable bundle is achieved by edge illuminating the bared fiber ends at an input terminal cable end, and detecting the quality of transmitted light emanating from the bared ends of the fibers at a receiving terminal cable end. The transmitted light emitting from the face of the receiving cable end is magnified by a microscope or the like. A second light source illuminates the surface of the receiving cable end to enable the faces of the broken fibers to be distinguishable from the remaining background. The end faces of the broken fibers will appear as dark spots since the input illumination is absent, being interrupted by the break in the fiber somewhere along its length. The faces of the light transmitting unbroken fibers will appear as bright spots. A suitable camera attachment may be provided in conjunction with the microscope to obtain a permanent record of the magnified image of the output cable end.

8 Claims, 3 Drawing Figures

FIBER BREAK DETECTION METHODS FOR CABLES USING MULTI-FIBER OPTICAL BUNDLES

BACKGROUND OF THE INVENTION

This invention relates to multi-optical fiber cables, and more particularly to a method and apparatus for determining the optical degradation of light transmission through the cable caused by breakage of the individual fibers.

The transmission of radiant energy along a plurality of fine optic fibers in a composite coherent or incoherent cable, is becoming increasingly important for various types of communication and data link systems and the like because of the inherent advantages over conventional energy transmission lines. One of the many tests that are necessary to evaluate the structural and other physical property characteristics, is a test of the optical transmission losses that may occur indicating fiber optic cable degradation. One of the most common causes of such degradation is caused by individual fiber breakage that may occur during manufacturing or handling.

At the present time, there is no currently available method in the state-of-the-art to assess the individual fiber breakage level of optical multi-fiber bundles. Photometric methods are available to evaluate gross optical cable transmission performance. However, while these methods quantify the cable transparency, they do not identify the specific fiber degradation that may be involved. Knowledge of the breakage modes can enable remedial action aimed at optical link repair and maintenance, the details of which form no part of this invention.

SUMMARY OF THE INVENTION

Observation of the integrity of the individual fiber breaks within a cabled, multi-fiber optical bundle assists in understanding the optical degradation mechanisms in effect, and enables remedial action to improve optical transmission performance, and to meet established requirements. The invention method enables that optical system qualification can be obtained simply and rapidly by a visual test method that can be performed at a laboratory or at a field installation.

The novel method establishes a test procedure whereby light is transmitted through the bundled cable from an input terminal to an output terminal. A light source is positioned to illuminate the face of the cable input. A diffusing means can be interposed between the light source and the cable face to assure that all fiber filaments will receive a sufficient light flux within their respective numerical aperture acceptance cones.

The degradation of the transmitted light caused by individual fiber breakage is assessed by magnifying the face of the output terminal cable end. Viewing the magnified output terminal face will disclose those fiber filaments that have been broken somewhere along the cable length by the absence of light emission from those individual fiber ends which will appear as circular dark spots. The faces of the fiber filaments that are unbroken will appear as bright circular spots caused by the emission of light therefrom.

To optimize this visual assessment, the output terminal end must be surface illuminated at a suitable range of incidence angles with respect to the output cable. Both input light source and output surface illumination can be made adjustable in intensity.

A camera attachment can be utilized in conjunction with the microscope to obtain a permanent picture record of the output illumination.

STATEMENT OF THE OBJECTS OF INVENTION

It is a principal purpose of this invention to provide a method and apparatus for detecting breakage of individual fiber filaments of a composite multi-fiber optic cables; and a corollary object is to obtain a permanent photographic record of the illumination pattern of such cable.

Another important object is to provide a method and apparatus that can be performed at an installation site; that is simple in construction and that can be expeditiously performed.

other objects, advantages and novel features of the invention will become apparent from the following detailed description of the invention when considered in conjunction with the accompanying drawings.

DESCRIPTION OF THE PREFERRED EMBODIMENT

Figure 1:
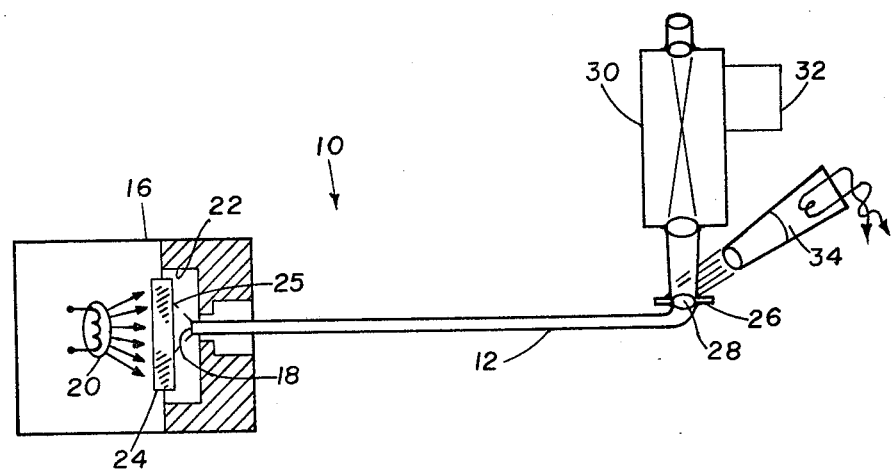
FIG. 1 is a diagrammatic illustration of the apparatus utilized in carrying out the novel method of this invention.

Referring to the drawings where like reference numerals refer to similar parts throughout the figures, there is shown in FIG. 1 a diagrammatic illustration of the apparatus 10 by which the novel method of the invention can be performed.

The fiber optic cable bundle to be tested is illustrated at 12, and may be a test length of such cable as a quality control check, or a run of such cable already mounted in a given installation for the purpose of determining the breakage that may have occurred during installation, or for periodic test purposes.

There are many types of fiber glass optic cables for example, one commercially available cable is manufactured by Corning Glass Works, type 5011, containing about 900 fiber filaments, each having a 1.8 mil diameter with a numerical aperture of about 0.63. The fibers are encased in an outer protective covering. Such cables can be of the incoherent type (light pipes) or of a coherent type (display).

The object of the novel method is to enable a simple and expeditious visual assessment of the breakage of the individual fiber filaments 14 (FIG. 2) in the bundle of fibers which make up composite cable 12.

A suitable fixture 16 is provided for fixedly supporting an input terminal end 18 of the cable 12. A variable intensity light source 20 i.e., 100ft./candle bulb is mounted in a suitable enclosure 22 for providing an input illumination to input terminal end 18.

A diffusing glass 24 or the like is supported in enclosure 22, and is positioned between light source 20 and input terminal end 18 to assure that all of the ends of the fiber filaments 14 will receive sufficient uniform light flux within their respective numeral aperture acceptance cone 25, shown in broken lines.

A second fixture 26 is provided to support an output terminal end 28 of cable 12. A microscope 30, or other suitable magnifying device, is positioned in-line with output terminal end 28 to be able to view the illumination transmitted through fiber filaments 14 from light source 20 and emitting from output terminal end 28. For laboratory testing, it has been found that a suitable microscope is a "Bausch and Lomb, Model Stereo Zoom 7," having a Polaroid camera attachment 32.

A variable intensity surface illuminating source 34 is adjustably positioned at an appropriate incidence angle with the face output terminal end 28 to provide means for detection of all of the fiber filaments with the cable bundle, and for distinguishing the broken fibers from the remaining background of the cable face in a manner to be described.

Figure 2:
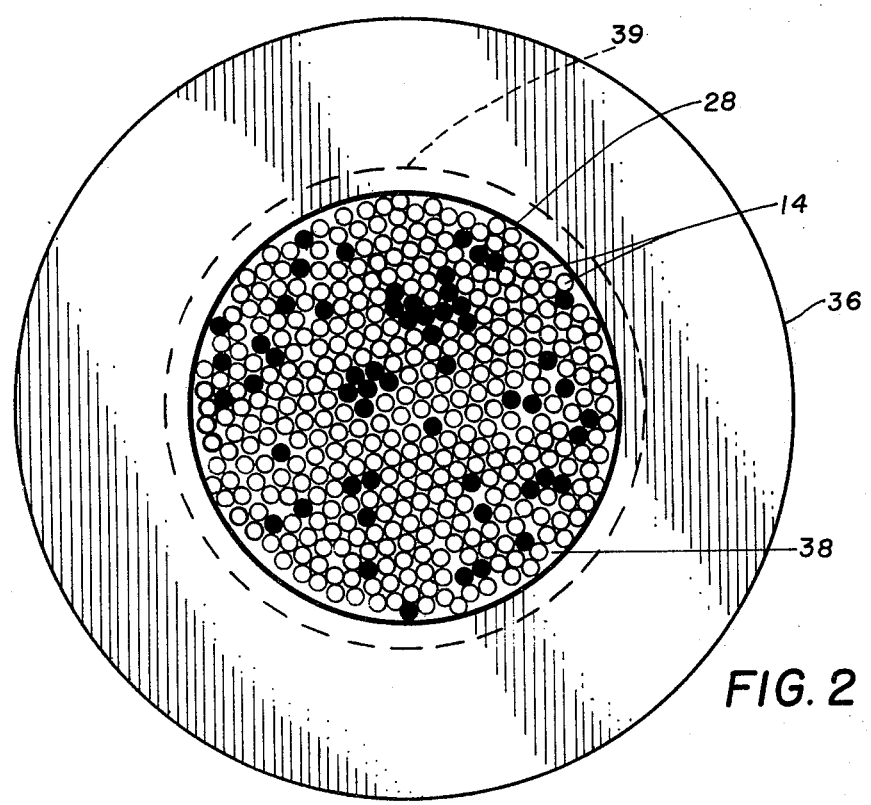
FIG. 2 is a magnified photographic record of the output terminal end of the fiber glass cable bundle showing the darkened spots of the broken fiber glass filaments, and the bright spots of the unbroken fiber glass filaments.

FIG. 2 illustrates a copy of magnified polaroid photograph of the face of the output terminal end 28 showing the illumination being emitted therefrom. A terminal plate 36 is shown encompassing the bared end of the fibers in cable 12.

Those fiber filaments 14 that are unbroken throughout their length emit transmitted light from their ends which appear as bright circular spots, being represented by open circles in FIG. 2. Those fiber filament ends that are broken at some point along their length do not transmit light, and appear as black, or darkened, circles in FIG. 2.

The purpose of utilizing surface illumination source 34 is to be able to distinguish the broken fibers from the unbroken fibers and from the background of epoxy material 38 in which the fiber filaments are usually potted within the outer protective cable covering. The light from source 34 on the epoxy material is substantially reflected in various directions due to the fact that its surface is comparatively rough and scratched. Accordingly, the epoxy material will substantially reflect the light, and appear as irregularly shaped light areas, readily distinguishable from the unbroken fiber ends from which the transmitted light is emitted in bright circular spots. On the other hand, the surface light from source 34 shining on the smooth polished ends of broken fiber ends is substantially absorbed into the broken fiber ends, as well as being reflected outside the field of the microscope and since there is no transmitted light for the input source, the broken fiber ends appear as dark circular spots.

Figure 3:
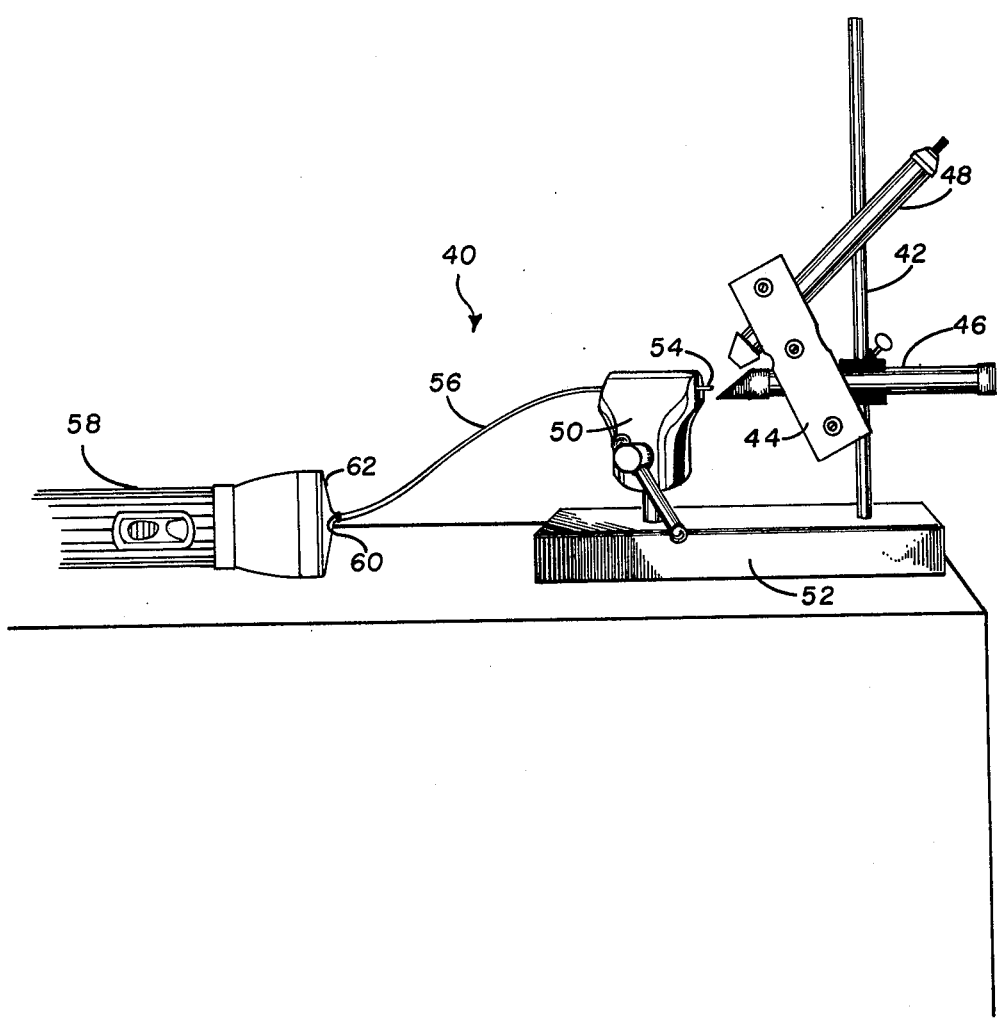
FIG. 3 is a portable fiber cable break-detection apparatus.

A portable optic cable break detection apparatus 40 is illustrated in FIG. 3. This apparatus is particularly suitable for fiber break measurements being conducted in a laboratory in conjunction with other physical tests where the cables are not readily removable from a test chamber, or where the detection method is conducted on site at an installed cable location on board a ship or other like installation.

Apparatus 40 comprises a light output station including stand 42 or other suitable means for supporting a bracket 44 in which is clamped a fixed fifty-power monocular microscope 46, and a pencil flashlight 48 which provides the surface illumination. A vice 50 mounted on a base 52 is used to clamp the output end 54 of fiber optic cable 56 being tested. The terminal connectors that may be normally associated with the cable installation are not illustrated. A flashlight 58 provides the illumination for the input end 60 of the cable supported thereto by a suitable attachment 62.

It is to be noted in the portable break detection apparatus 40 of FIG. 3 that no photographic capability is provided, however, the observer can provide a written record of the visual observation.

The novel method and apparatus of this invention enables the detection of broken fibers in a fiber optic cable enabling suitable repairs, if needed, to meet qualification standards, or replacement of the cable. The apparatus is simple and inexpensive and is readily adapted to be portable for use in installations where cables have been installed.

Obviously many modifications and variations of the present invention are possible in the light of the above teachings. It is therefore to be understood that within the scope of the appended claims the invention may be practiced otherwise than as specifically described.

What is claimed is:

1. A method of diagnostically assessing the breakage of individual fiber filaments in a composite fiber glass cable bundle comprising the steps of:
    illuminating an input terminal end of said cable for transmission of the light therethrough to an output terminal end of said cable:
    illuminating the surface of the output terminal end of the cable;
    magnifying the face of the output terminal end of said cable;
    whereby the integrity of light transmission through said cable can be assessed by determining the number of fiber filament ends which appear dark indicating the absence of transmitted light.

2. The method of claim 1 which includes the step of diffusing the light introduced at the input terminal end.

3. The method of claim 1 which includes the step of photographing the magnified face of the output terminal end of the cable to obtain a permanent record of the fiber breakage.

4. Apparatus for diagnostically testing the light transmission integrity of a multi-fiber optic cable which comprises:
    a light source for illuminating an input end of said cable;
    a second light source for illuminating the surface of the output end of the cable;
    a microscope for viewing the transmitted light through said cable being emitted from an output end of said cable;
    whereby the ends of the broken fibers will appear as dark spots readily distinguishable from the light spots of the unbroken fibers from which the light emits.

5. The apparatus of claim 4 wherein means are provided for supporting each of the input and output ends of the cable.

6. The apparatus of claim 4 wherein a diffusing means is provided between the first named light source and the input end of the cable.

7. The apparatus of claim 4 wherein said second light source is oriented at an angle with respect to the face of the output end of the cable.

8. The apparatus of claim 4 wherein a photographic means is associated with the microscope to obtain a permanent record of the illumination emitted from the output end of the cable.

* * * * *